(12) United States Patent
Lipukin et al.

(10) Patent No.: US 6,464,928 B1
(45) Date of Patent: Oct. 15, 2002

(54) GAS REGULATION SYSTEM FOR BLAST FURNACE

(75) Inventors: Yuri Victorovich Lipukin, Cherepovets; Valentin Konstantinovich Kornev, Tula; Ivan Filippovich Kurunov; Vladislav Andreevich Dobroskok, both of Moscow; Valeri Nikolayevich Loginov, Cherepovets, all of (RU)

(73) Assignee: AirProducts and Chemicals INC, Allentown, PA (US)

( * ) Notice: Subject to any disclaimer, the term of this patent is extended or adjusted under 35 U.S.C. 154(b) by 0 days.

(21) Appl. No.: 09/600,964

(22) PCT Filed: Jan. 29, 1998

(86) PCT No.: PCT/US98/01621

§ 371 (c)(1),
(2), (4) Date: Oct. 23, 2000

(87) PCT Pub. No.: WO99/39012

PCT Pub. Date: Aug. 5, 1999

(51) Int. Cl.[7] ................................................ C21B 7/22
(52) U.S. Cl. ....................................... 266/148; 266/267
(58) Field of Search ................................ 266/217, 265, 266/267, 148

(56) References Cited

U.S. PATENT DOCUMENTS 3,814,404 A * 6/1974 Claflin ........................ 266/267
3,928,023 A * 12/1975 Claflin ........................... 75/60
4,047,937 A * 9/1977 Kolb et al. ...................... 75/60
5,660,542 A * 8/1997 Rinker et al. ................. 432/19

FOREIGN PATENT DOCUMENTS

GB  2 018 299 A  10/1999

OTHER PUBLICATIONS

Kornev, V.K., et al., "Acceleration of Ironmaking by Injection of Gas–oxygen Mixture Into Blast Furnace," 2283 Steel in the USSR, Nov. 21, 1991, No. 11, pp. 488–190.
Database Search, Derwent, XP–002079562, Komm Mine-Metal Ins., Sep. 16, 1996, 1 p.
Database Search, Derwent, XP002079563, Tulachermet Assoc., Sep. 23, 1996, 1 p.
Database Search, Derwent, XP002079564, Ekontekh Stock Co., Jun. 30, 1994, 1 p.
International Search Report of PCT/US98/01621 mailed Oct. 13, 1998, 5 pp.

* cited by examiner

*Primary Examiner*—Scott Kastler

(57) ABSTRACT

A system for introducing a homogenous mixture of natural gas and oxygen into the tuyeres of a blast furnace. Included in this system are gas conduits with flow controllers connected to a mixer that produces a homogenous mixture. Provisions are made to by-pass the mixer and to introduce inert gas into the mixer to prevent formation of explosive gas mixtures.

12 Claims, 2 Drawing Sheets

GAS REGULATION SYSTEM FOR BLAST FURNACE

BACKGROUND OF THE INVENTION

This invention relates to the field of ferrous metallurgy, specifically the blast-furnace process, and is applicable to feeding natural gas into blast furnaces.

In trying to reduce fuel consumption in a blast-furnace process by burning natural gas in a more efficient way, various gas regulation systems for blast furnaces have been developed.

One system was designed for regulation of the pressure and rate of natural gas injected into a blast furnace and for its distribution among the air tuyeres. That system consisted of: a natural gas supply pipe-line provided with a shutoff, safety, measuring and control instruments, a bypass line complete with gate valves and gas vent, and a circular manifold with connections for feeding gas to each air tuyere, the circular manifold provided with shutoff and safety devices. This gas regulation system suffers from a number of drawbacks. Among them are; lack of measuring and regulating devices in connecting pipes feeding natural gas to tuyeres, lack of devices preventing the formation of explosive mixtures in the gas regulation system, lack of a system for maintaining the prescribed ratio between the natural gas and blast air (or blast oxygen) flow rates, and lack of devices for preparation of natural gas for efficient combustion in the tuyere zone.

Another gas regulation system for use with a blast furnace, is the one consisting of the natural gas pipe-line with shutoff, safety, measuring and control instruments, a pipe-line, connected to the natural gas line and equipped with shutoff and control instruments, for purging and filling it with inert gas; a bypass line with shutoff and regulation instruments, and a distributing manifold with connections, equipped with shutoff, safety, measuring and regulating instruments, for feeding the gas to each air tuyere. This gas regulation system eliminates most of the drawbacks of the previous system but retains its main weakness, namely inability to prepare natural gas for efficient burning in a blast furnace which leads to excessive fuel usage in making pig iron.

BRIEF SUMMARY OF THE INVENTION

The goal of the invention is to improve the last described process above to reduce the rate of fuel usage rate in the blast-furnace process.

In order to achieve this goal the present invention includes a gas regulation S system for a blast furnace consisting of natural gas and inert gas pipe-lines, a distributing manifold with gas supply lines to air tuyeres and a bypass pipe-line, as well as shutoff, safety, measuring and control instruments installed in those pipe-lines and a mixer in the natural gas pipe-line and an oxygen supply pipe connected to the mixer, with a by-pass pipe connected to the natural gas pipe-line before and after the mixer, and an inert gas pipe-line connected to the oxygen supply line.

Thus in one aspect the present invention is a system for introducing a mixture of natural gas and oxygen into the tuyeres of a blast furnace having a source of natural gas connected to a mixer via a natural gas supply pipe or conduit, the pipe having, upstream of the mixer, a flow control valve to initiate, control and terminate flow of a natural gas to the mixer, flow control means between the flow control valve and the mixer, with a check valve between the flow control means and the mixer, a source of oxygen connected to the mixer via an oxygen supply pipe or conduit the pipe having, upstream of the mixer a flow control valve to initiate, control and terminate flow of oxygen to the mixer, flow control means followed by a check valve between the flow control valve and the mixer, means to introduce an inert gas into the mixer, and means to by-pass the mixer to deliver natural gas, without mixing with oxygen and/or inert gas, directly to the blast furnace tuyeres.

In a preferred embodiment of the invention the mixer is made in the form of a cylindrical chamber with a diameter to length ratio being in the range of 0.4–0.7. A perforated tube, connected to the oxygen supply pipe-line with one end closed, is inserted into the cylindrical chamber with the longitudinal axis of the tube perpendicular to the longitudinal axis of the cylinder, wherein diameter of the perforated tube is equal to 0.15–0.5× the diameter of the cylindrical chamber of the mixer. The total area of the holes in the perforated tube is in the range of 0.3–0.6× the flow area of the tube with the diameter of holes in the range of 0.03–0.07× the tube diameter.

DETAILED DESCRIPTION OF THE INVENTION

Figure 1:
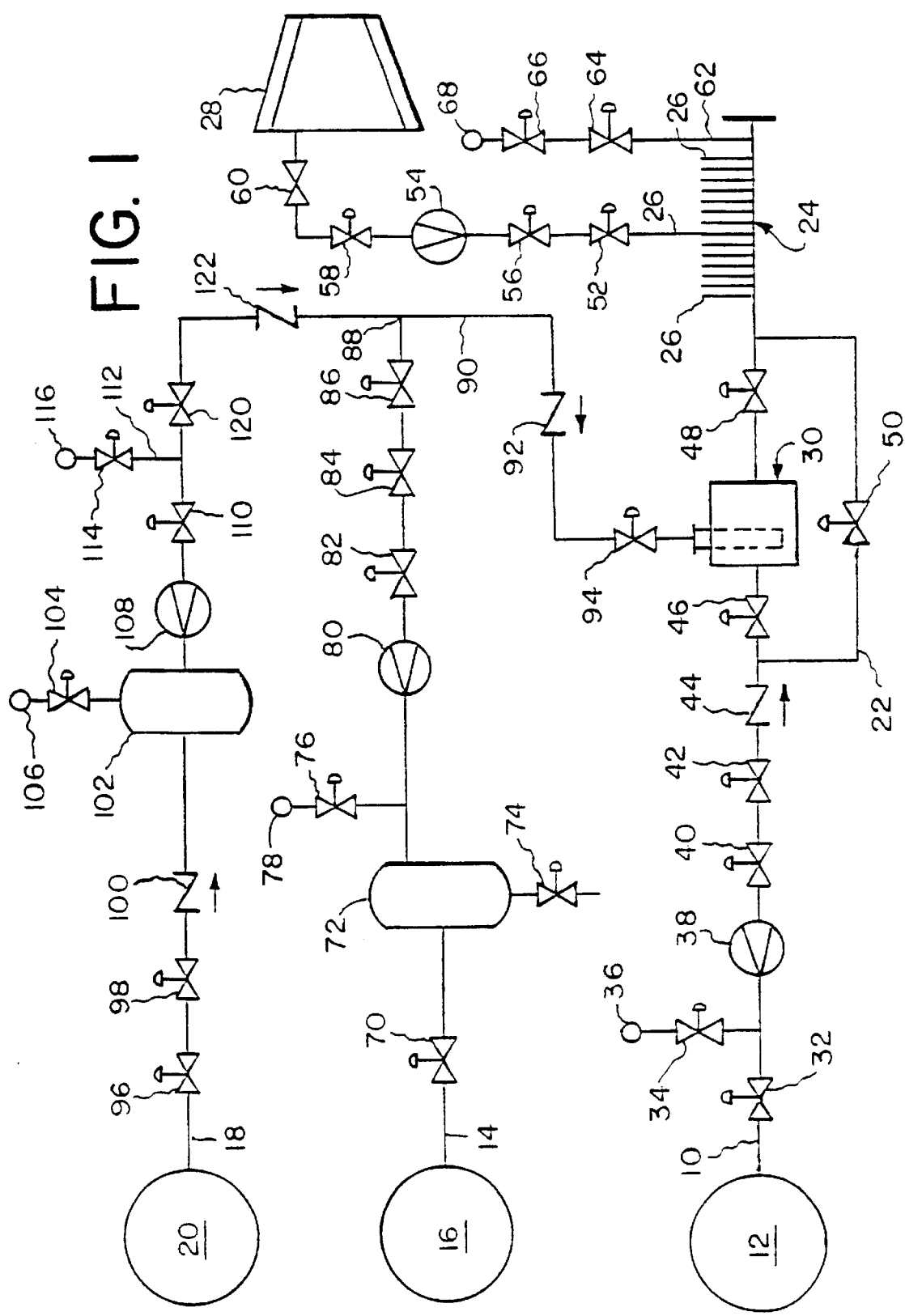
FIG. 1 is a schematic representation of a gas regulation system according to the present invention.

As shown in FIG. 1 the gas regulation system includes: a natural gas pipe line or conduit 10 connected to a source of natural gas 12, an oxygen pipe-line or conduit 14 connected to a source of oxygen 16 and inert gas pipe-line or conduit 18 connected to a source of inert gas 20, a bypass line or conduit 22, a manifold 24 with delivery pipe-lines or conduits 26 for supplying the gas to blast furnace (air) tuyeres 28, and a mixer 30.

Pipe-lines 10, 14, and 18 are designed to feed natural gas, oxygen and inert gas, e.g. nitrogen, respectively into the mixer 30. The bypass pipe-line 22 serves to supply natural gas directly into the manifold 24 bypassing the mixer 30. Manifold 24 and delivery pipe-lines 26 are intended to supply natural gas or a natural gas/oxygen mixture to the blast furnace tuyeres 28. The mixer 30 is designed to obtain a homogeneous mixture of natural gas and oxygen.

Natural gas pipe-line, conduit or supply line 10 is equipped with a shut-off or control valve 32 to initiate or terminate the flow of natural gas from source 12, a bleeder control valve 34 leading to a bleeder valve or device 36 to vent natural gas or purge the system, an orifice plate 38, solenoid operated valve 40, regulating valve 42, check valve 44, mixer 30 and mixer isolation valves 46 and 48 together with mixer bypass conduit 22 and mixer by-pass valve 50. Pipe-line 10 supplies natural gas to a manifold 24 which supplies pipe-lines (e.g. 26) which in turn supply the natural gas to the blast furnace tuyere(s) 28. Delivery pipe-line or conduit 26 includes natural gas flow control valve 52, flow plate 54 and flow plate isolation valves 56 and 58 and a check valve 60. Manifold 24 also includes a vent or recovery conduit 62 with a manual control valve 64 and solenoid operated control valve 66 leading to a bleeder valve or recovery or vent system 68.

Oxygen pipe-line, conduit or supply line 14 is equipped with a manual control valve 70, a dust collector or separator 72 with a clean out valve 74. Dust collector 72 serves to remove solid particulate material from the oxygen. The pipe-line 14 is fitted with a bleeder control valve 76 leading to a bleeder valve, recovery or vent system 78. Downstream of the system 78 is an orifice plate 80, regulating valve 82, solenoid operated control valve 84 and a shut-off valve 86 upstream of the location 88 where the nitrogen pipe-line 18 enters a common conduit 90 which is connected through a check valve 92 and control valve 94 to the mixer 30 as will hereinafter be more fully explained.

Nitrogen pipe-line, conduit or supply line 18 includes a cut-off valve 96 to initiate or terminate nitrogen flow through conduit 18, control valve 98 and check valve 100 leading to a surge tank 102. Inclusion of surge tank 102 is intended to enable the user to create an emergency reserve by accumulation of an excess amount of inert gas. Surge tank 102 can be bled or vented through a system including a control valve 104 leading to a recovery or vent 106. Downstream of surge tank 102 pipe-line 18 includes an orifice plate 108 a shut-off valve 110 a branch line or conduit 112 with a control valve 114 leading to a bleeder, vent or recovery system 116, a control valve 120 upstream of a check valve 122, in pipe-line 18 prior to its entry into the common conduit 90 at location 88.

Shut off devices, which include gate valves, solenoid-operated and manually operated valves, as well as regulating valves and cutoff valves, serve to shut off, or isolate from the gas regulation system, separate pipe-lines or sections of pipe-lines when gases supplied to the system are stopped, i.e., during repair and maintenance work and in emergency situations.

Safety devices which include check valves and bleeder valves are intended to a) automatically cut off oxygen supply to the mixer, b) to automatically switch on and continuously feed inert gas into the oxygen pipe-line and, c) cut off inert gas automatically with reduction of its pressure in the outer circuit in emergency situations, as well as, d) to bleed a certain amount of oxygen and inert gas from the system in case of excessive pressure.

Measuring instruments in addition to the orifice plates or flow meters can include pressure and temperature sensors, to measure; the flow rates of natural gas, oxygen, inert gas, natural gas/oxygen mixtures and blast air, the pressure of natural gas, oxygen, inert gas and blast air, and, the temperature of the natural gas/oxygen mixture. Instruments, not shown in FIG. 1, are intended to regulate oxygen pressure, natural gas pressure and flow rates of natural gas, oxygen and natural gas/oxygen mixtures. Such instrumentation is well known in the art.

Figure 2:
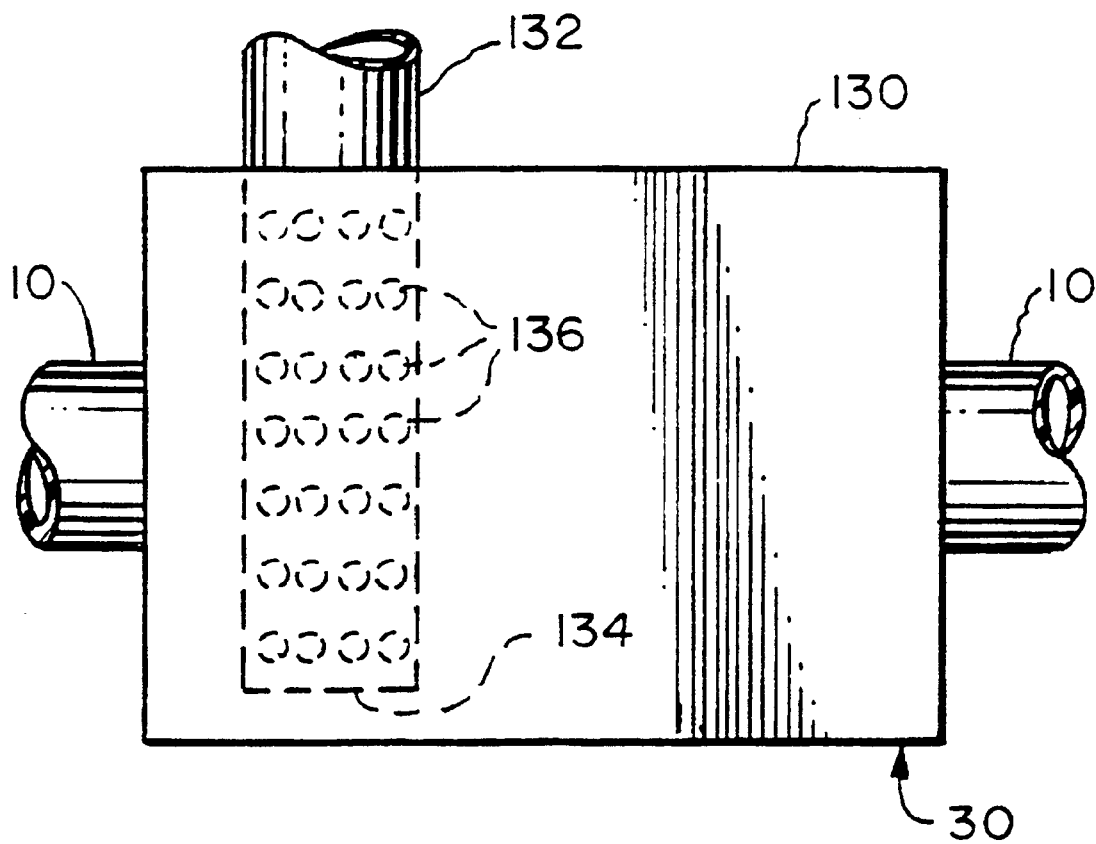
FIG. 2 is a schematic representation of a mixer according to the invention.

Referring to FIG. 2 during the operation of the gas regulation system natural gas and oxygen are supplied into the mixer 30 through pipe-lines 10 and 14 at the pre-assigned pressure values and preset ratio of flow rates. A homogeneous natural gas/oxygen mixture formed in the mixer arrives at the manifold 24 and via connecting pipe-lines 26 is fed into tuyere(s) 28. The mixer 30 includes a cylindrical chamber portion 130 which is disposed in pipe-line or conduit 10 between valves 46 and 48 with the axis of rotation of the cylinder coincident with or parallel to the longitudinal axis of pipe-line 10. A tube 132 communicating with the common pipe-line 90 downstream of valve 94 is placed into the cylindrical portion 130 of mixer 30 generally perpendicular to the axis of rotation of the cylindrical chamber portion 130. The tube 132 has a closed end 134 and a plurality of perforations 136. The tube 132 is fixed in fluid tight relation to the cylindrical chamber portion 130 with all of the perforations 136 inside of the chamber 130.

Inert gas (e.g. nitrogen) via pipe-line (18) is mixed with or injected into the oxygen from pipe-line (14) in common conduit 90 during the start-up of the gas regulation system in order to prevent the formation of explosive mixtures.

The maximum homogeneity of the natural gas/oxygen mixture is provided at the following ratios;
  diameter of the mixer cylindrical chamber to its length 0.4–0.7
  diameter of perforated tube to diameter of cylindrical chamber 0.15–0.5
  diameter of holes in perforated tube to its diameter 0.03–0.07
  total area of holes in the tube to its flow section 0.3–0.6
which ratios were determined experimentals.

A system according to the invention was fabricated and installed in a blast furnace shop in Cherepovets in the Russian Federation. The system had a mixer fabricated as shown in FIG. 2 with the following dimensions:
  A. Cylindrical Chamber Portion (130)
    Inside Diameter 410 mm (16.14 inches)
    Length 750 mm (29.52 inches)
  B. Tubes or Perforated Pipe (132)
    Inside Diameter 100 mm (3.93 inches)
    Total Cross-sectional Area of Holes or Perforations 3532 mm$^2$ (5.48 sq. inches)
    Number of holes or perforation 180
    Diameter of each hole or perforation 5 mm (0.20 inches)

The mixing chamber was operated to provide a homogeneous mixture of 20% oxygen, balance natural gas when the oxygen flow to the perforated pipe was 52 Nm$^3$ (1940.6 std ft$^3$)/minute and natural gas flow was 208 Nm$^3$ (7762.6 std ft$^3$)/minute.

When natural gas arrives at the tuyeres in the form of a uniform mixture with oxygen, the process of burning of natural gas accelerates which provides for its complete combustion in the tuyere zone, increases coke replacement ratio and decreases coke and total fuel consumption during blast furnace operation.

Having thus illustrated and described the invention herein with reference to certain specific embodiments, the present invention is nevertheless not intended to be limited to the details shown. Furthermore, various modifications may be made in the details within the scope of the invention that is defmed in the appended claims.

What is claimed is:

1. A gas mixing apparatus for introducing a mixture of natural gas and oxygen into tuyeres of a blast furnace comprising in combination:
  a source of natural gas connected to a mixer, via a natural gas s supply pipe or conduit, said pipe having, upstream of said mixer, a flow control valve to initiate, and terminate flow of natural gas to said mixer, flow control means between said flow control valve and said mixer, with a check valve between said flow control means and said mixer to control flow of said natural gas to said mixer;
  a source of oxygen connected to said mixer via an oxygen supply pipe or conduit, said pipe having, upstream of said mixer, a flow control valve to initiate, and terminate flow of oxygen to said mixer, flow control means followed by a check valve between said flow control valve and said mixer to control flow of oxygen to said mixer;

means to introduce an inert gas into said mixer; and means to by-pass said mixer to deliver natural gas without mixing with oxygen and/or inert gas directly to said blast furnace tuyeres.

2. A gas mixing apparatus according to claim 1, wherein a dust collector means is included in said oxygen supply pipe between said flow control valve and said flow control means.

3. A gas mixing apparatus according to claim 1, wherein said means to introduce inert gas into said mixer includes a source of inert gas connected to an inert gas pipe or supply conduit, a flow control valve to initiate or terminate inert gas flow in said inert gas pipe, a surge tank between said flow control valve and a common pipe or conduit leading to said mixer connected to said oxygen and inert gas pipes upstream of said mixer, and flow control means between said surge tank and said common pipe with a check valve between said flow control and said common pipe.

4. A gas mixing apparatus according to claim 1, wherein said mixer is a cylindrical chamber connected to said natural gas supply pipe downstream of said check valve, with a tube having a first or supply end connected to said oxygen supply conduit downstream of said check valve, and a second or closed end with said tube having a plurality of perforations through a portion of its length, said perforations proximate said closed end of said tube, said tube inserted into said cylindrical chamber with the axis of rotation of said tube disposed perpendicular to the axis of rotation of said cylinder, and said tube in fluid tight communication with said cylindrical chamber, said perforations in said tube being entirely within said cylindrical chamber.

5. A gas mixing apparatus according to claim 4, wherein the diameter to length ratio of the cylindrical chamber is equal to 0.4–0.7.

6. A gas mixing apparatus according to claim 4, wherein diameter of the perforated tube is equal to 0.15 to 0.5× the diameter of cylindrical chamber of the mixer.

7. A gas mixing apparatus according to claim 4, wherein the total area of perforations in the perforated tube is in the range of 0.3 to 0.6× the total flow area of the tube.

8. A gas mixing apparatus according to claim 4, wherein the diameter of each hole in the perforated tube is in the range of 0.03 and 0.07× the diameter of the tube.

9. A gas mixing apparatus according to claim 1 including means to purge said natural gas conduit upstream of said flow control means.

10. A gas mixing apparatus according to claim 4 including means to purge said oxygen conduit between a dust collector placed downstream of said flow control valve and said flow control means.

11. A gas mixing apparatus to claim 1, wherein said means to introduce an inert gas into said oxygen supply conduit includes a source of inert gas connected to said oxygen supply conduit via an inert gas pipe or conduit, said pipe having upstream of said oxygen supply conduit a flow control valve to initiate, control and terminate flow of inert gas to said oxygen supply conduit, a surge tank downstream of said control valve between a first check valve and a flow control means, a second control valve between said flow control and said oxygen conduit, and a second check valve between said second control valve and said oxygen conduit.

12. A gas mixing apparatus according to claim 9 including a first means to purge said surge tank and a second means to purge said inert gas conduit between said second control valve and said second check valve.

* * * * *

UNITED STATES PATENT AND TRADEMARK OFFICE
CERTIFICATE OF CORRECTION

PATENT NO. : 6,464,928 B1 Page 1 of 1
DATED : October 15, 2002
INVENTOR(S) : Lipukin et al.

It is certified that error appears in the above-identified patent and that said Letters Patent is hereby corrected as shown below:

Title page,
Item [56], References cited, OTHER PUBLICATIONS, Kornev, V.K., et al. delete "pp. 448-190" and substitute therefor -- pp. 488-490 --.

Column 1,
Line 50, delete the letter "S".

Column 4,
Line 53, delete the letter "s".

Signed and Sealed this

Eleventh Day of February, 2003

JAMES E. ROGAN
*Director of the United States Patent and Trademark Office*